US008095689B2

United States Patent
Abu-Akel

(10) Patent No.: US 8,095,689 B2
(45) Date of Patent: Jan. 10, 2012

(54) REMOTE ACTIVATION DEVICE FOR A COMPUTER

(75) Inventor: Fouad Geries Abu-Akel, Duluth, GA (US)

(73) Assignee: InterMetro Industries Corporation, Wilkes-Barre, PA (US)

( * ) Notice: Subject to any disclaimer, the term of this patent is extended or adjusted under 35 U.S.C. 154(b) by 377 days.

(21) Appl. No.: 12/048,328

(22) Filed: Mar. 14, 2008

(65) Prior Publication Data

US 2008/0229091 A1 Sep. 18, 2008

Related U.S. Application Data

(60) Provisional application No. 60/895,158, filed on Mar. 16, 2007.

(51) Int. Cl.
*G06F 15/16* (2006.01)
(52) U.S. Cl. ........ 709/250; 709/223; 709/224; 709/226; 709/227
(58) Field of Classification Search ............ 709/250
See application file for complete search history.

(56) References Cited

U.S. PATENT DOCUMENTS

| | | | |
|---|---|---|---|
| 5,673,983 A | 10/1997 | Carlson et al. | |
| 6,493,220 B1 * | 12/2002 | Clark et al. | 361/679.41 |
| 6,721,178 B1 | 4/2004 | Clark et al. | |
| 2003/0135654 A1 | 7/2003 | Chang | |
| 2004/0105421 A1 | 6/2004 | Maki et al. | |
| 2004/0268111 A1 * | 12/2004 | Dayan et al. | 713/2 |
| 2005/0047356 A1 | 3/2005 | Fujii et al. | |
| 2006/0112287 A1 | 5/2006 | Paljug | |
| 2007/0094708 A1 * | 4/2007 | Hess | 726/2 |
| 2007/0228680 A1 * | 10/2007 | Reppert et al. | 280/47.35 |

FOREIGN PATENT DOCUMENTS

KR 20030084473 11/2003

OTHER PUBLICATIONS

"White Paper: Wake on LAN Technology", Lieberman Software, REv 2—Jun. 1, 2006. Copyright 2003-2006 Lieberman Software Corporation (pp. 1-9).
"Magic Packet Technology, White Paper," AMD, Publication# 20213, Rev: A, Issue Date, Nov. 1995. Copyright 1998 Advanced Micro Devices, Inc.

* cited by examiner

*Primary Examiner* — Jeffrey Pwu
*Assistant Examiner* — Sulaiman Nooristany
(74) *Attorney, Agent, or Firm* — Harness, Dickey & Pierce, P.L.C.

(57) ABSTRACT

A remote activation device for enabling WOL capability in a target computer that is not connected to a wired network is disclosed. The remote activation device is WOL compatible and simulates a network host computer using WOL technology for "waking-up" the target computer. The remote activation device generally comprises a microcontroller and a communications controller. The device is connected to the target computer via the communications controller of the device and a wired network adapter of the target computer. As such, the remote activation device forms a "mini-network" with the target computer. The remote activation device generates and sends a WOL magic packet to the target computer instructing the computer to power ON. Once the computer is powered ON, the computer is able to wirelessly connect to a WLAN in the target computer's work environment. A computer administrator is then able to manage the target computer via network host computer. Alternatively, a computer user is able to commence work on the target computer.

55 Claims, 7 Drawing Sheets

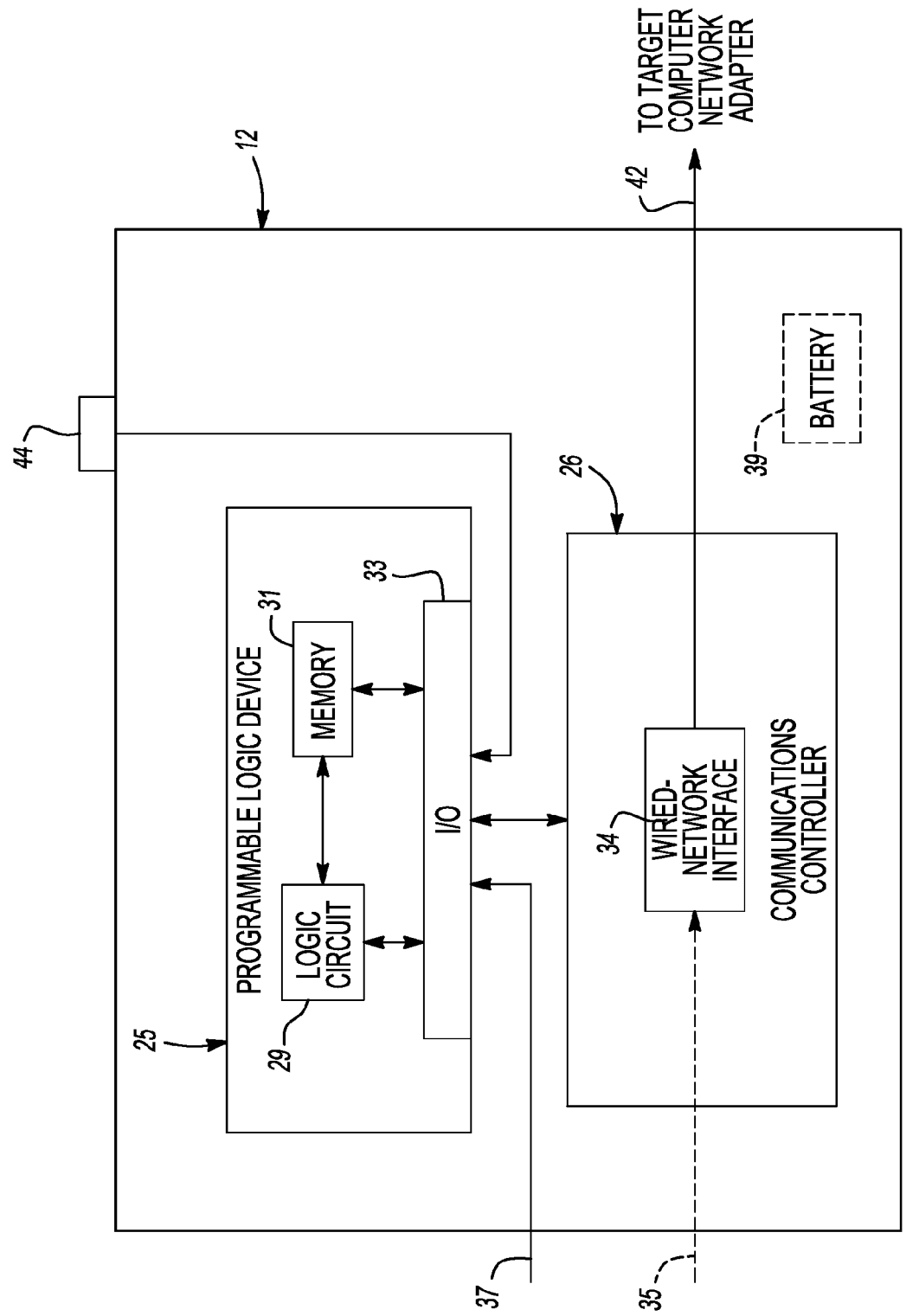

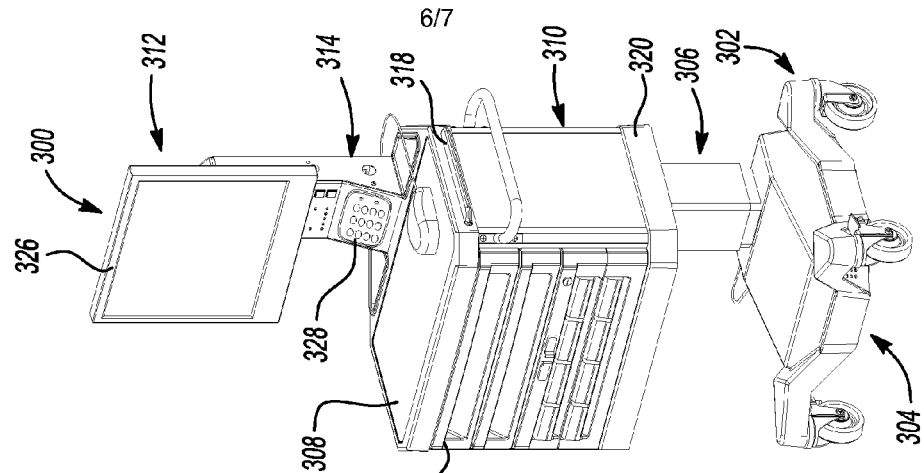
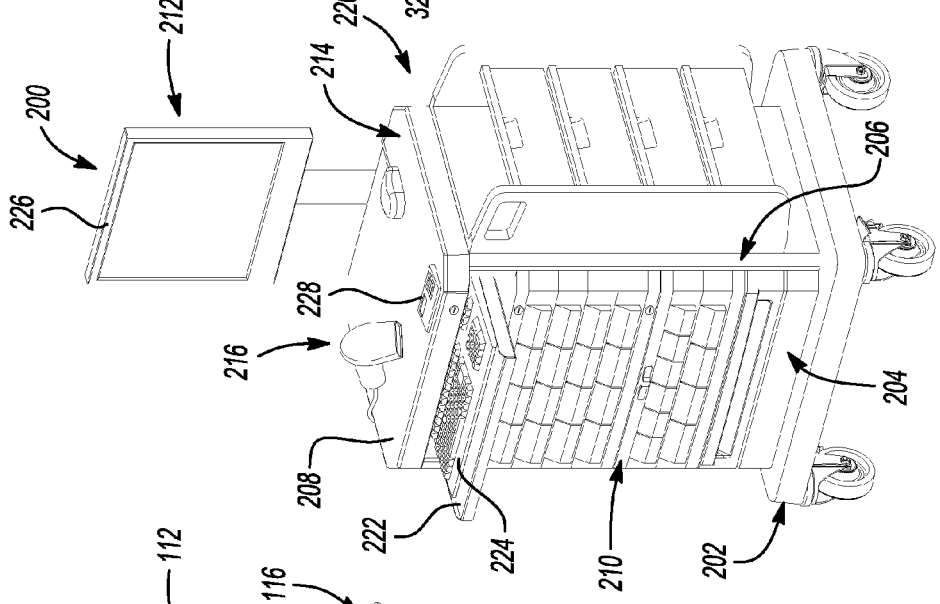
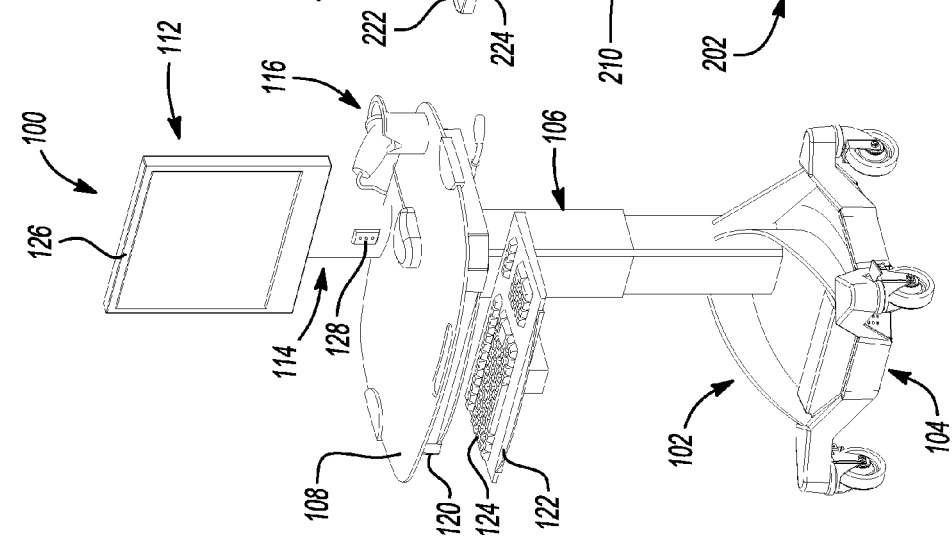

REMOTE ACTIVATION DEVICE FOR A COMPUTER

FIELD

The present disclosure generally relates to a remote activation device for a computer, and more particularly a remote activation device that provides wake-on-LAN (WOL) functionality when the computer is not connected to a computer network.

BACKGROUND

The statements in this section merely provide background information related to the present disclosure and may not constitute prior art.

Wake on LAN (WOL) is a well-known computer technology and has been available since the late 1990's. WOL is hardware and software that is used to "wake up" (i.e., power ON) "sleeping" (i.e., turned OFF) computer systems. WOL sends specially coded signals (i.e., a magic packet) from one machine (e.g., a host computer) to another machine (e.g., a target computer) over a wired computer network to power ON the target computer. WOL functionality allows a computer administrator to remotely power ON all of the computers on a wired network so that those machines can receive maintenance or updates, even though the users have turned OFF the computers.

WOL functionality requires that the target computer receiving the WOL signal be physically connected to a wired computer network, and that the target computer be equipped to respond to the WOL signal sent by a host computer. Consequently, WOL technology support has been incorporated into LAN on motherboard (LOM) and LAN adapter cards of mobile computers, such as notebook computers.

Mobile computer workstations are becoming commonplace in a growing population of work environments. Generally speaking, a mobile computer workstation is a transportable work platform into which a computer, such as a notebook PC, is seamlessly integrated. Such computer workstations are often specially adapted for the particular tasks and work functions in the field or industry in which they are used. For example, mobile computer workstations that are specially adapted for use in hospitals and similar medical facilities are well-known. One such mobile computer workstation is shown in U.S. Pat. No. 6,721,178 entitled, "Mobile Clinical Workstation" and assigned to Flo Healthcare Solutions, LLC, the assignee of the subject application. The disclosure of U.S. Pat. No. 6,721,178 is hereby incorporated herein by reference.

Typically, the computer of a mobile computer workstation is not connected to a wired network, but is configured for wireless connectivity to a LAN. Moreover, the computer is not even wirelessly connected to the LAN when the computer is powered OFF during non-use and may not be connected to the LAN when the workstation is recharging its onboard power supply. In such instances, a computer administrator responsible for managing one or more mobile computer workstations cannot take advantage of WOL functionality for performing routine tasks on the workstation computers because the computer is not wired to the network.

Thus, there remains a need for a device which provides WOL capability for a computer of a mobile computer workstation that is not connected to a network.

Additionally, because the computer of a mobile computer workstation is typically housed in a secure location on the workstation, such as in a locked compartment, the computer's power switch is not readily accessible to the workstation's user. Prior attempts to enable the user to remotely access the computer's power switch, although satisfactory for specific applications, have not proved applicable for each of the variety of computers that may be employed in a workstation. Thus, there remains a need for a device that enables user to power ON a computer that is inaccessible to the user, notwithstanding the particular computer that is used in the workstation.

SUMMARY

Disclosed is a remote activation device for use with a mobile computer workstation that is not connected to a network. The remote activation device operates to power ON a sleeping computer of a mobile computer workstation so that the computer can subsequently connect to a WLAN in a work environment and receive routine maintenance or updates, or perform a desired operation as instructed by the network's host computer.

The remote activation device can also provide a user accessible "ON" switch for the computer in applications where the computer, itself, is physically inaccessible to the user, such as where the computer is located in a secured compartment or housing. Once powered ON, the computer is ready for use by the user.

The remote activation device generally comprises a microcontroller and a communications controller. The remote activation device is connected to the computer of the mobile computer workstation via the communications controller of the device and a network adapter of the workstation's computer. The remote activation device is configured to simulate a network host computer using WOL technology for "waking-up" the workstation computer. As such, the remote activation device replaces the network host computer and forms a "mini-network" with the target computer. The remote activation device generates and sends a WOL magic packet to the workstation's computer instructing the computer to power ON. Once the computer is powered ON, the computer is able to wirelessly connect to the LAN in the work environment. Thereafter, a network host computer is able to communicate with the workstation computer. Consequently, an administrator can manage the computer of the workstation.

The remote activation device can be operated manually, automatically, and/or remotely. In one embodiment of the remote activation device, the device includes a user-accessible "ON" switch. When the user actuates the switch, the remote activation device generates and sends a WOL magic packet to the target computer to turn the computer ON. In another embodiment of the remote activation device, the device includes an antenna for receiving a radio signal. The device is then prompted by a radio signal from, for example, a host computer, to generate and send a WOL magic packet to the target computer. The radio signal may be generated in real-time by the action of a user, such as a computer administrator, or it may be programmed to be generated automatically, as desired. In still another embodiment of the remote activation device, the device includes a timer that is programmed to cause the device to generate and send a WOL magic packet to the target computer at a predetermined date and time, for example.

Ultimately, the remote activation device is able to power ON the mobile workstation's computer without the workstation's computer being connected to a wired network. The remote activation device can be used with any computer that incorporates or is compatible with WOL technology.

The remote activation device is relatively small and is easily integrated into the mobile computer workstation. The remote activation device's power requirements are minimal, and it can operate on power supplied by its own dedicated battery, or on power supplied by the workstation's main power supply.

In one aspect, the disclosure provides a remote activation device for enabling WOL capability in a target computer having a wired network interface that is not connected to a wired computer network having a microcontroller including a processor module for generating a WOL magic packet signal, a memory module for storing the MAC address of the target computer, and an I/O module and a communications controller in communication with the microcontroller and adapted to provide a wired-network connection between to the target computer and the remote activation device, the communications controller sending the magic packet to the target computer over the wired-network connection.

In another aspect, the disclosure provides a remote activation device for enabling WOL capability in a target computer having a wired network interface that is not connected to a wired computer network including a programmable logic device having a logic circuit for generating a WOL magic packet signal, a memory module for storing the MAC address of the target computer, and an I/O module and a communications controller in communication with the microcontroller and adapted to provide a wired-network connection between to the target computer and the remote activation device, the communications controller sending the magic packet to the target computer over the wired-network connection.

In still another aspect of the disclosure a computer workstation is disclosed as including a base unit, a power unit housed within the base unit, the power unit operable to power the workstation, a support unit mounted to and extending vertically upward from the base unit, a generally horizontal and flat work surface mounted to the support unit and above the base unit, a monitor assembly mounted above the work surface and comprising a monitor and a monitor mounting structure, the mounting structure enabling the monitor to pivot about at least one axis, a control unit housed within one of the monitor assembly or the work surface, a computer housed within a compartment mounted to the support unit, and a remote activation device for enabling WOL capability in the computer while it is not connected to a wired computer network.

In yet another aspect, the disclosure provides a computer workstation having a base unit adapted to house a power unit, the power unit comprising a charging system and at least one rechargeable battery, a support unit mounted to and extending vertically upward from the base unit, a height adjustable work surface mounted to the support unit and above the base unit, the work surface comprising a generally flat work surface, a storage unit located below the work surface, the storage unit adapted to house a computer, a remote activation device for enabling WOL capability in the computer while it is not connected to a wired computer network, and a monitor assembly mounted to the support unit and above the work surface.

Another aspect of the disclosure describes a mobile workstation having a moveable chassis, a substantially horizontal tray supported by the chassis that defines a work surface, a height adjustment mechanism for altering the height of the horizontal tray, a display screen adjacent to the work surface that is tiltable relative to the work surface, an input device tray supported adjacent to the work surface, a power unit supported by the chassis for supplying power to the display screen, a computer, and a remote activation device for enabling WOL capability in the computer while it is not connected to a wired computer network.

Still another aspect of the disclosure provides a method for using a remote activation device for enabling WOL capability in a target computer that is not connected to a wired computer network involving synchronizing the remote activation device with the target computer, initiating operation of the remote activation device via a user-actuated input device, generating a WOL magic packet signal by the remote activation device and sending the WOL magic packet signal from the remote activation device to the target computer, and powering ON the target computer. Additionally, establishing wireless network connection between the target computer and a WLAN and remotely initiating operations on the target computer via a WLAN are described.

Yet another aspect of the disclosure is a method for enabling WOL capability in a target computer that is not connected to a wired computer network. The method includes providing a remote activation device comprising a microcontroller a communications controller in communication with the microcontroller, obtaining the MAC address of the target computer, programming the MAC address into the microcontroller of the remote activation device, initiating operation of the remote activation device, establishing a wired network connection between the remote activation device and the target computer, generating a WOL magic packet signal in the remote activation device, and sending the WOL magic packet signal from the remote activation device to the target computer causing the target computer to power ON.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2d is a a block diagram generally describing still another alternate configuration of the remote activation device.

FIG. 3a is a front perspective view of one exemplary mobile computer workstation incorporating the remote activation device.

FIG. 3b is a front perspective view of another exemplary mobile computer workstation incorporating the remote activation device.

FIG. 3c is a front perspective view of still another exemplary mobile computer workstation incorporating the remote activation device.

DETAILED DESCRIPTION

The following description is merely exemplary in nature and is not intended to limit the present disclosure, application, or uses.

Figure 1:
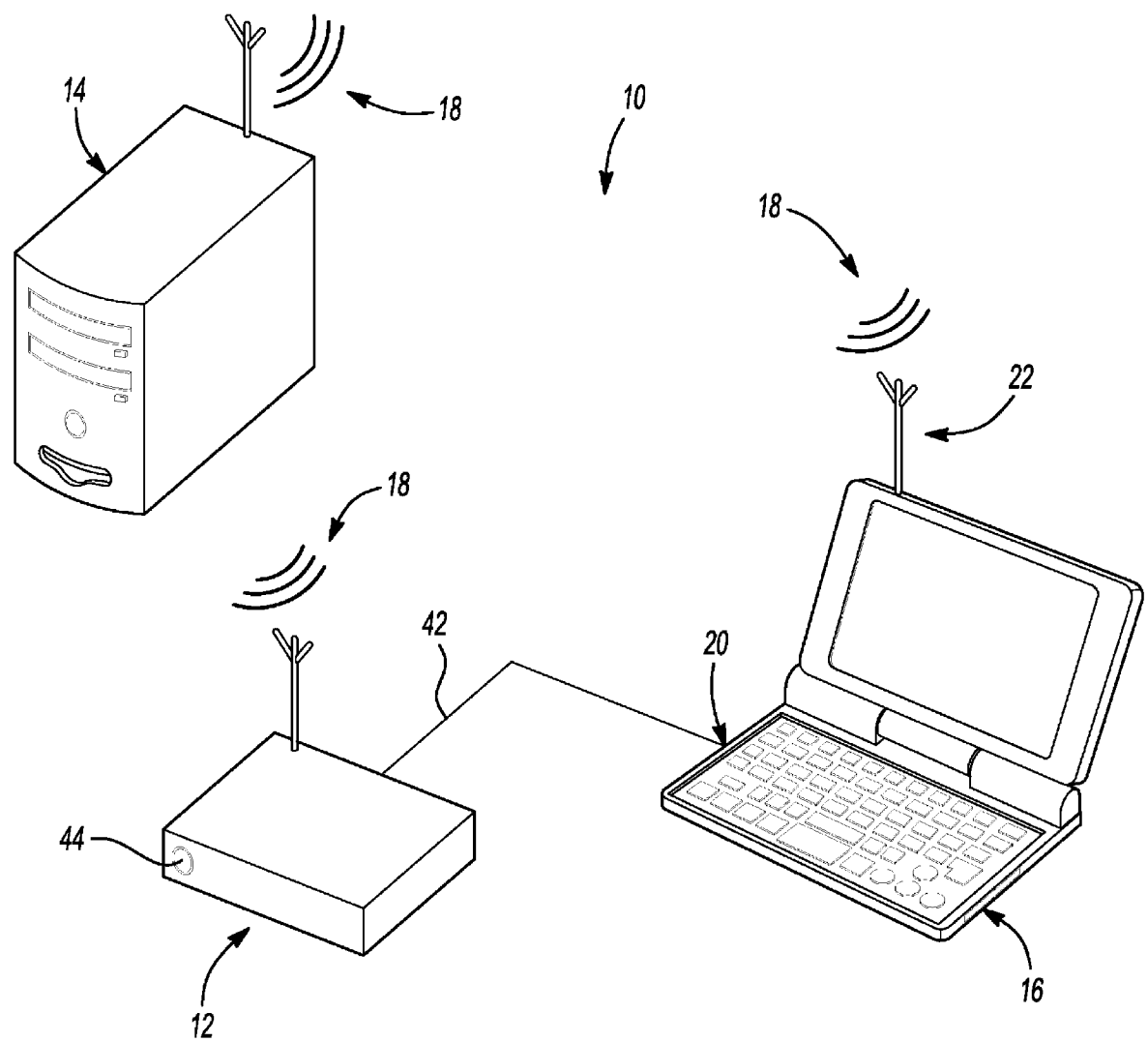
FIG. 1 illustrates an exemplary computer system incorporating the remote activation device.

An exemplary computer system 10 incorporating the remote activation device 12 of the present disclosure is shown in FIG. 1. The exemplary computer system 10 comprises a network host computer 14 (e.g., a network server) and a target computer 16 (e.g., a network client), which are connected via a wireless local area network 18 (i.e., a WLAN, such as one complying with 802.11 family of specifications), and the remote activation device 12.

The target computer 16 includes a wired-network interface 20 (e.g., a network interface card, such as an Ethernet adapter). In addition, the target computer 16 is equipped with a wireless network interface 22 (e.g., a wireless network interface card including an antenna) for wireless connectivity to the WLAN. Moreover, the target computer 16 is WOL compatible. The target computer 16 can be integrated into, for example, a mobile computer workstation (see, e.g., FIGS. 3a, 3b and 3c). When operating in such a configuration, the target computer 16 is typically not connected to a LAN via its wired-network interface. Rather, the target computer 16 employs a wireless network interface to connect to the WLAN 18 while in service.

Figure 2A:
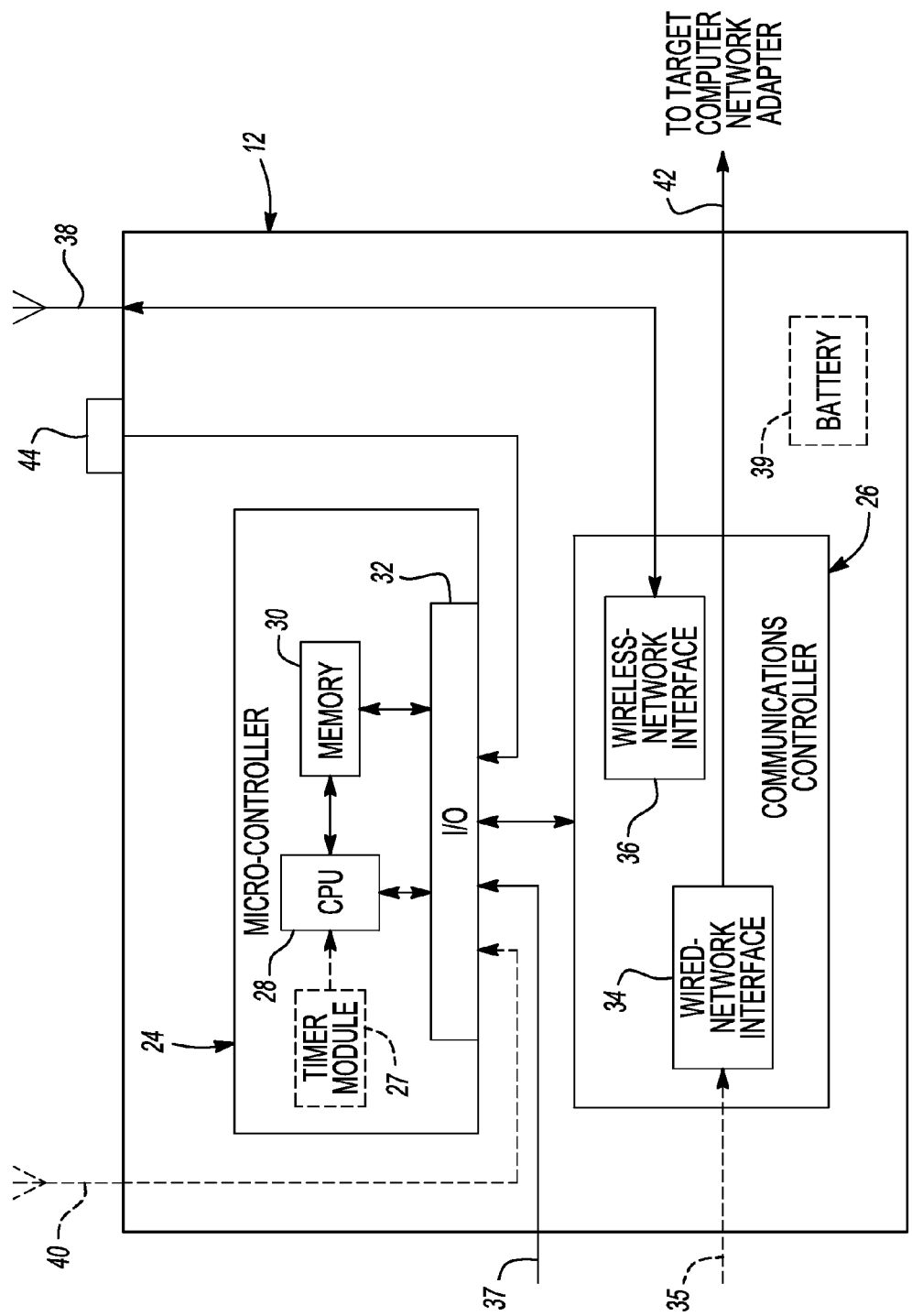
FIG. 2a is a block diagram generally describing the remote activation device.
Figure 2B:
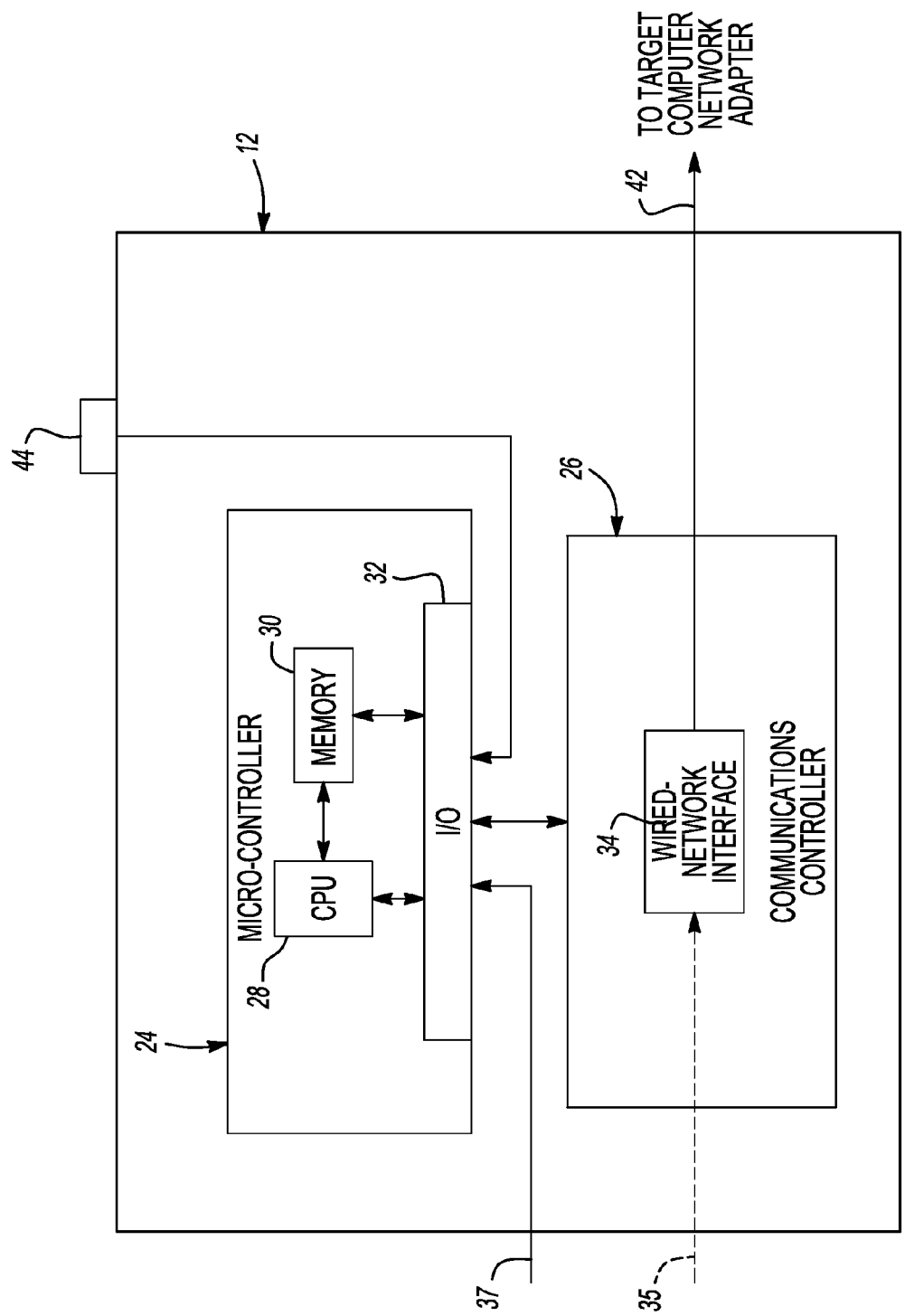
FIG. 2b is a block diagram generally describing an alternate configuration of the remote activation device.

Referring to FIGS. 2a and 2b, the remote activation device 12 generally comprises a microcontroller 24 and a communications controller 26. The microcontroller 24 can include a processing module 28, such as a central processing unit (e.g., an 8-bit processor), a memory module 30 (e.g., RAM, ROM, PROM, EPROM, EEPROM, or Flash memory) and an input/output (I/O) module 32. Alternatively, or in addition, the microcontroller 24 can further include a timer module 27.

Figure 2C:
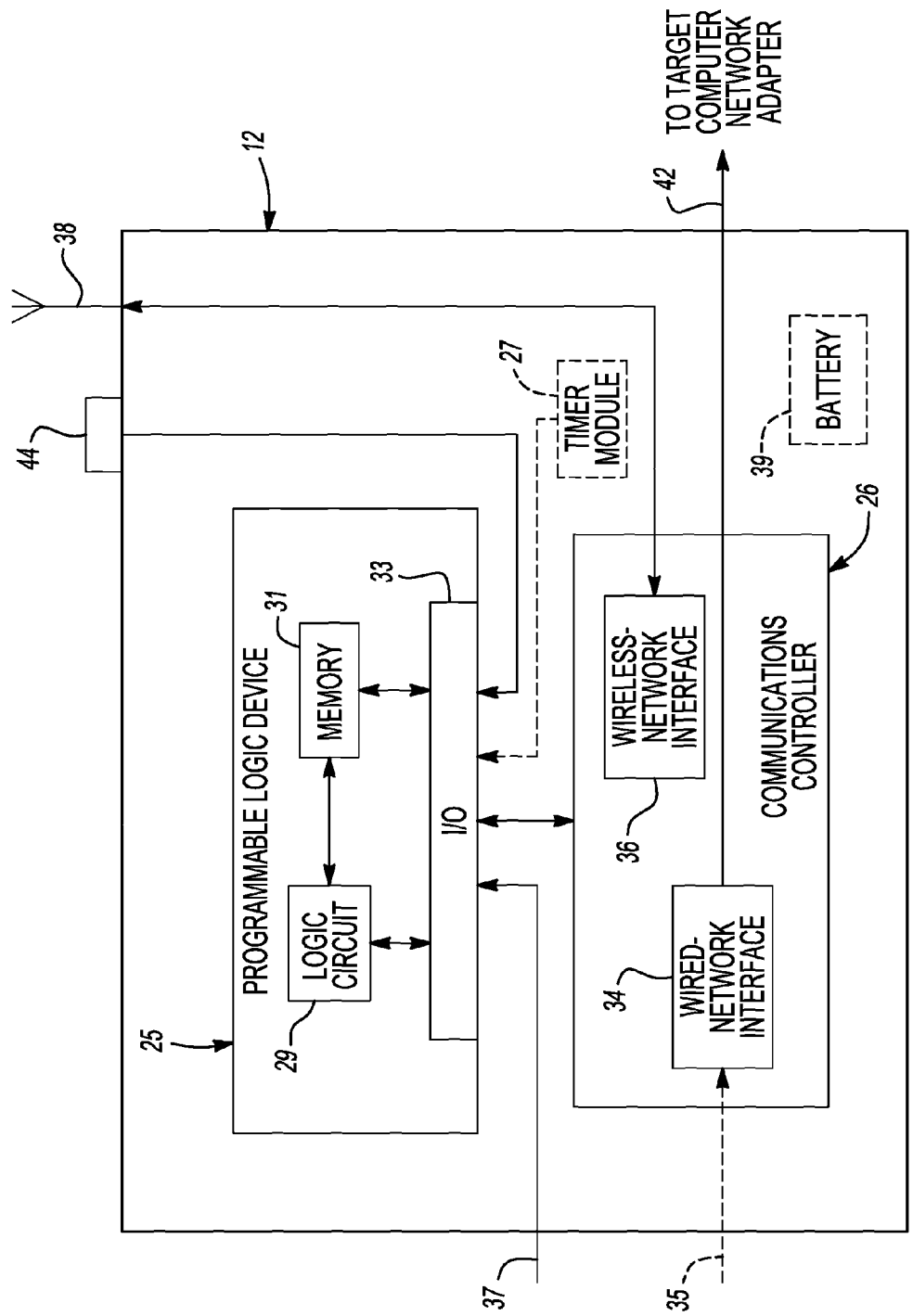
FIG. 2c is a block diagram generally describing another alternate configuration of the remote activation device.

Alternatively, the remote activation device 12 can comprise a programmable logic device 25, including a logic circuit 29, a memory module 31 and an I/O module 33, as shown in FIGS. 2c and 2d.

The communications controller 26 can comprise a wired-network interface module 34 (e.g., an Ethernet adapter) for wired-network connectivity to the target computer 16, as described below, and optional wired-network connectivity to a LAN 35. In addition, the communications controller can optionally comprise a wireless network interface module 36 and antenna 38 for network connectivity to the WLAN 18 (see FIGS. 2a and 2c). Wired and wireless network interfaces that are well-known in the art are suitable for use with the activation device 12.

Alternatively, or in addition, the remote activation device 12 can include an antenna 40 for receiving signals at a frequency other than the frequency at which the WLAN 18 is operating.

The remote activation device 12 is connected to a target computer 16 (e.g., the computer of a mobile computer workstation) via the wired network interface module 34 of the communications controller 26 of the device 12 and a wired network interface 20 of the target computer 16. An Ethernet cable 42, as is well-known in the art, can provide the physical means to achieve the wired connection between the remote activation device 12 and target computer 16. In this manner, the remote activation device 12 simulates a network host computer and forms a "mini-network" with the target computer 16. The remote activation device 12 can then use WOL technology to "wake-up" the target computer 16. In this regard, the remote activation device 12 generates and sends a WOL magic packet to the target computer 16 which instructs the computer to power ON. Once the target computer 16 is ON, the target computer 16 is capable of connecting to the WLAN 18 and network host computer 14 of the work environment. Thereafter, the network host computer 14 is able to communicate and provide instructions (e.g., to carry out maintenance processes) to the target computer 16 via the WLAN 18.

Ultimately, the remote activation device 12 is operable to power ON the target computer 16 without the target computer 16 being connected to a wired network. The remote activation device 12 can be used with any target computer 16 that incorporates or is compatible with WOL technology.

The remote activation device 12 is relatively compact and its power requirements are generally minimal. The remote activation device 12 can be operated on power supplied by its own dedicated battery 39 (see, e.g., FIG. 2b), or on power supplied by another device, such as the main power supply of a mobile computer workstation into which the remote activation device 12 can be integrated.

Referring to FIGS. 3a, 3b and 3c, the remote activation device 12 may be easily integrated into a mobile computer workstation 100, 200, 300. An exemplary mobile computer workstation is disclosed in U.S. Pat. No. 6,721,178 entitled, "Mobile Clinical Workstation" and assigned to Flo Healthcare Solutions, LLC, the assignee of the subject application. Another exemplary mobile computer workstation is disclosed in U.S. Patent Application Publication no. 2007/0228680 entitled, "Modular Workstation." The disclosures of U.S. Pat. No. 6,721,178 and U.S. Patent Application Publication no. 2007/0228680 are hereby incorporated herein by reference.

FIGS. 3a-3c show various mobile computer workstations 100, 200, 300 into which the remote activation device 12 can be incorporated. The mobile computer workstations 100, 300 of FIGS. 3a and 3c generally include major components like a base unit 102, 302, a power unit 104, 304, a support unit 106, 306, a work surface 108, 308 with or without an optional storage unit 310, a monitor assembly 112, 312 and a control unit 114, 314. The base unit 102, 302 provides a foundation for the workstation 100, 300 and also houses the power unit 104, 304. The support unit 106, 306 is mounted to, and extends vertically from, the base unit 104, 304. The work surface 108, 308 and optional storage unit 310, the control unit 114, 314 and the monitor assembly 112, 312 are, in turn, mounted to the support unit 106, 306. In mobile computer workstations 200 like that shown in FIG. 3b, a work surface 208 and storage unit 210 is mounted to the base unit 202.

The power unit 104, 204, 304 provides electrical power (e.g., DC power) to the workstation 100, 200, 300 and its accessories and/or peripheral components 116, 216, optionally including the remote activation device 12 if that device does not incorporate its own internal power supply, such as a battery 39, for example. The power unit 104, 204, 304 may comprise a charging system and one or more rechargeable batteries. The charging system receives AC power from, for example, a wall outlet, and delivers DC power to the batteries to charge them.

The support unit 106, 306 may be vertically adjustable (see, e.g., FIGS. 3a and 3c) to control the position of work surface 108, 308 and optional storage unit 310, control unit 114, 314 and monitor assembly 112, 312 to suit a wide range of user preferences under a variety of working conditions, such as standing or being seated, for example. Alternatively, the work surface 208 and any included storage unit 210 may be of a fixed height, as is depicted in FIG. 3b.

The work surface 108, 208, 308 and optional storage unit 210, 310 is mounted to the support unit 106, 306 above the base unit 102, 302 (FIGS. 3a and 3c) or is mounted directly to the base unit 202 via cabinet support unit 206 (FIG. 3b). The work surface 108, 208, 308 and optional storage unit 210, 310 provides the workstation 100, 200, 300 with ample working and storage space. The top of the work surface 108, 208, 308 is shown to be a generally flat surface that provides a space where the user may perform the general work duties that are associated with the use of the mobile computer workstation 100, 200, 300.

An additional feature that can be incorporated into the work surface 308 is an auxiliary work surface 318 that is located just beneath the work surface 308 (see, e.g., FIG. 3c). The auxiliary work surface 318 comprises a pull out tray that is capable of being extended from either the left or right side of the work surface 308. The auxiliary work surface 318 provides the user with additional flat work space, and may accommodate workstation peripherals, such as a computer mouse, for example. Because it may be alternatively located on either the right or left of the workstation 300, the auxiliary work surface 318 provides additional flexibility for the user to configure the workstation 300 to his or her preferences.

Located generally beneath the work surface 108 or near the bottom of the storage unit 210, 310 is a computer compartment 120, 220, 320. The computer compartment 120, 220, 320 is provided to house a computer, such as a notebook PC, for example, which is integrated into the workstation 100, 200, 300. The remote activation device 12 can also be housed in the computer compartment 120, 220, 320 in close proximity to the computer.

In another configuration, the workstation 100 includes a keyboard tray 122, 222 located below the work surface 108, 208, upon which a computer keyboard 124, 224 may be located (see, e.g., FIGS. 3a and 3b). The keyboard tray 222 may be pulled out during use or pushed into the storage compartment 210 when in its stowed position. Alternatively, the storage compartment 310 houses a lockable, enclosed keyboard compartment 322 as an alternative to the keyboard tray 122, 222 (see, e.g., FIG. 3c). In its use position, the keyboard compartment 322 is extended from the storage compartment 310 so the computer keyboard is accessible (similar to that shown in FIG. 3b). In its stowed position (FIG. 3c), the keyboard compartment 322 is pushed into the storage compartment 310 where it may be locked to prevent access to the computer keyboard.

Alternatively, or in addition, the optional storage unit 210, 310 may be configured with a variety of modular storage solutions to enable the workstation 200, 300 to be suitable for any of a number of work environments and tasks. As one example, a removable storage cassette assembly which houses multiple slide-out drawers or cassette bins that are suited for the storage and organization of any of a variety of items may be integrated into the workstation, such as that disclosed in U.S. Pat. No. 5,673,983, the disclosure of which is hereby incorporated herein by reference. Such a configuration may be suitable for use in a workstation adapted for medical point of care (POC) service. In this regard, the workstation may be configured for the storage and dispensing of pharmaceuticals and/or medical items, like medications, syringes, bandages, gauze, tape, and the like. The cassette assembly and/or cassette bins may be easily removed from the workstation to be re-supplied. As such, the entire workstation does not have to be out of use during such periods. By having more than one cassette assembly, the workstation's modularity is advantageous.

A monitor assembly 112, 212, 312 is located above the work surface 108, 208, 308. The monitor 126, 226, 326 may be mounted to the monitor assembly 112, 212, 312 with monitor bracketing to permit the monitor 126, 226, 326 to rotate 360 degrees in a vertical plane, and/or in planes at an angle to the work surface 108, 208, 308.

The control unit may 114, 214, 314 alternatively be disposed within the monitor assembly 112 (see, e.g., FIG. 3a) or in the work surface 208, 308 (see, e.g., FIGS. 3b and 3c). The control unit 114, 214, 314 provides a measure of security for the workstation 100, 200, 300 by allowing access to the workstation 100, 200, 300 only by authorized users. In this regard, the control unit 114, 214, 314 enables an authorized user to gain physical access to the workstation's storage unit 210, 310 and the items stored therein, such as by enabling the user's control over a variety of the workstation's locking features. Alternatively, the control unit 214, 314 may also provide authorized users with electronic access to the onboard computer, the computer keyboard, login authentication to the computer and/or a computer network and access to the computer's peripherals 116, 216, if any. The control unit 114, 214, 314 also includes a variety of indicators for the workstation's user, such as LEDs that indicate the status of the power unit or its components. For instance, the LEDs may indicate the level of charge held by the power unit 104, 204, 304 or the condition of its batteries. The control unit 114, 214, 314 may also enable the user to manage any user-adjustable features of the workstation 100, 200, 300.

A user interface 128, 228, 328 for the remote activation device 12, such as a power switch or button 44 (FIGS. 1 and 2), can be integrated into the control unit 114, 214, 314 to permit a user of the mobile computer workstation 100, 200, 300 to initiate operation of the remote activation device 12 manually, as further described herein.

Figure 4:
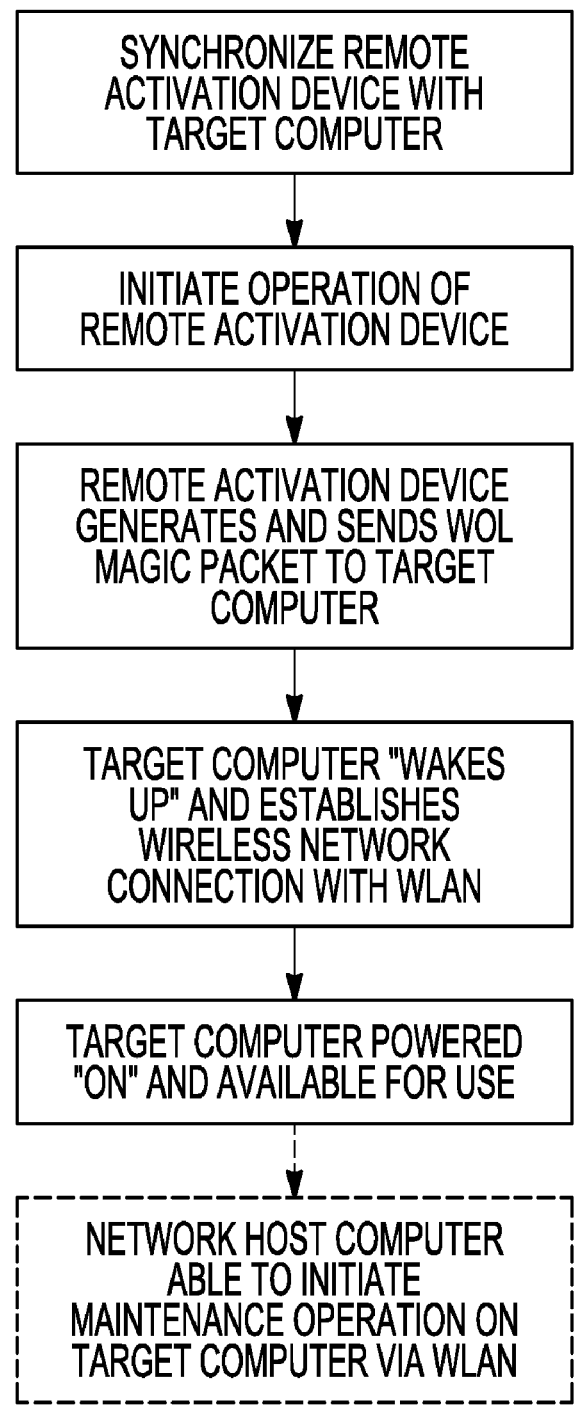
FIG. 4 is a block diagram illustrating an exemplary method of operation of the remote activation device.

The function and operation of the remote activation device 12 can be understood with reference to FIG. 4. In order for the remote activation device 12 to function properly, the remote activation device 12 must first be synchronized with the target computer 16; that is, the physical address (also known as the MAC address) of the target computer 16 with which the remote activation device 12 will be associated must be published or made known to the remote activation device 12.

The MAC address is necessary in order for the remote activation device 12 to communicate with the target computer 16. The MAC address is a unique identifier that is hard coded into the network interface card of the target computer 16. The MAC address is static and therefore does not change over time. As such, synchronization between the remote activation device 12 and the target computer 16 needs only to be accomplished once, unless the remote activation device 12 is later paired with a different target computer 16 having a different network interface card with a different MAC address, at which time the remote activation device 12 can be re-synchronized.

Synchronization with the target computer 16 can be achieved in any of a number of ways, and can be accomplished manually, semi-automatically or automatically. For example, the MAC address for the target computer 16 can be acquired from the network interface card manufacturer that encodes the MAC address or during boot-up of the target computer 16 into the pre-execution environment (PXE). Once obtained, the MAC address can be manually or automatically programmed into the remote activation device 12 and/or stored in its memory module 30 via the communications controller 26 or an external data interface 37, such as a serial connection, for example.

With continued reference to the flow diagram of FIG. 4, after synchronization, operation of the remote activation device 12 can be initiated. This can be accomplished manually, automatically, and/or remotely. In one embodiment of the remote activation device, the device includes a user-actuated switch or button to initiate operation of the remote activation device 12. In another embodiment of the remote activation device 12, the device can include an antenna for receiving a radio signal. The remote activation device 12 can be programmed to start upon being triggered by the radio signal. In still another embodiment of the remote activation device 12, the device 12 can include a timer module 27 (FIG. 2) that is programmed to prompt the device 12 begin operation at a predetermined time, such as a day, date, hour of the day, or other interval, for example. Moreover, any combination of these approaches can be incorporated into the remote activation device 12.

After operation of the remote activation device 12 is initiated, the remote activation device 12 then generates a WOL magic packet and sends it to the target computer 16 over the wired network connection between its communications controller and the wired network interface of the target computer 16.

The target computer 16, upon receiving the WOL magic packet, "wakes up". The target computer 16 can then negotiate a connection to a WLAN that has been established and is in present in the work environment. Once powered ON, the computer is available for use by the user.

After the WLAN connection is made, the network host computer 14 can initiate actions on the target computer 16, such as the performing of system maintenance, software upgrades, virus scanning, and the like.

It should also be appreciated that the remote activation device 12 can double as a simple "ON" switch for the computer; for example, in embodiments of the remote activation device 12 including the user-actuated switch or button 44. In such a configuration, the remote activation device 12 provides a mechanism by which the computer may be powered ON by a user in situations where the computer may be housed in a location that is inaccessible to the user, such as in a secure compartment 120, 220, 320 of a mobile computer workstation 100, 200, 300 (see, e.g., FIGS. 3a, 3b and 3c). When the user actuates the switch or button 44, the remote activation device 12 generates and sends a WOL magic packet to the target computer 16 to turn the target computer 16 ON, making it available for use by the user.

What is claimed is:

1. A computer workstation, comprising:
   a base unit adapted to support a power unit;
   the power unit comprising a charging system and at least one rechargeable battery;
   a support unit mounted to and extending vertically upward from the base unit;
   a height adjustable work surface mounted to the support unit and above the base unit, the work surface comprising a generally flat work surface;
   a storage unit located below the work surface, the storage unit adapted to house a computer having N communication ports available for wired connection to a computer network by a network cable and having a known physical address, wherein N is an integer greater than zero;
   a remote activation device located on the computer workstation, the remote activation device operable to wake up the computer using a WOL magic packet signal while the computer is shut down and not connected to a computer network, the remote activation device storing the physical address of the computer, selectively generating the WOL magic packet signal based on the physical address, and selectively transmitting the WOL magic packet signal to the computer over a network cable, the network cable directly connected at a first end to one of the N ports of the computer and at a second end to a communication port of the remote activation device, wherein none of the other (N−1) ports of the computer are connected to a computer network by wired connection; and
   a monitor assembly mounted to the support unit and above the work surface;
   wherein the remote activation device comprises:
   a microcontroller comprising a processor module for generating the WOL magic packet signal, a memory module for storing the physical address of the computer, and an I/O module; and
   a communications controller in communication with the microcontroller, the communications controller having the communication port a user-actuated device;
   wherein the communications controller sends the WOL magic packet signal to the computer over the network cable; and
   wherein the microcontroller generates and the communications controller transmits the WOL magic packet signal in response to actuation of the user-actuated device.

2. The computer workstation of claim 1, wherein the user-actuated device of the remote activation device comprises one of a switch or a button.

3. The computer workstation of claim 1, wherein the remote activation device further comprises a timer module, and
   wherein the microcontroller generates and the communications controller transmits the WOL magic packet signal at a predetermined time.

4. The computer workstation of claim 1, wherein the communications controller of the remote activation device further comprises a wireless-network interface module for wireless network connectivity to a WLAN.

5. The computer workstation of claim 1, wherein the user actuated device further comprises an antenna for receiving signals at a frequency different than the frequency at which any WLAN is operating.

6. The computer workstation of claim 5, wherein the microcontroller generates and the communications controller transmits the WOL magic packet signal in response to receipt of a signal by the antenna.

7. The computer workstation of claim 1, wherein the remote activation device further comprises a power source for powering the device.

8. The computer workstation of claim 7, wherein the power source of the remote activation device comprises a battery.

9. The computer workstation of claim 1, wherein the remote activation device is powered by the power unit.

10. The computer workstation of claim 1, wherein the remote activation device further comprises an external data interface.

11. The computer workstation of claim 10, wherein the external data interface of the remote activation device comprises a universal serial bus port.

12. A computer workstation, comprising:
    a base unit adapted to support a power unit;
    the power unit comprising a charging system and at least one rechargeable battery;
    a support unit mounted to and extending vertically upward from the base unit;
    a height adjustable work surface mounted to the support unit and above the base unit, the work surface comprising a generally flat work surface;
    a storage unit located below the work surface, the storage unit adapted to house a computer having N communication ports available for wired connection to a computer network by a network cable and having a known physical address, wherein N is an integer greater than zero;

a remote activation device located on the computer workstation, the remote activation device operable to wake up the computer using a WOL magic packet signal while the computer is shut down and not connected to a computer network, the remote activation device storing the physical address of the computer, selectively generating the WOL magic packet signal based on the physical address, and selectively transmitting the WOL magic packet signal to the computer over a network cable, the network cable directly connected at a first end to one of the N ports of the computer and at a second end to a communication port of the remote activation device, wherein none of the other (N−1) ports of the computer are connected to a computer network by wired connection; and a monitor assembly mounted to the support unit and above the work surface;

wherein the remote activation device comprises:

a programmable logic device comprising a logic circuit for generating the WOL magic packet signal, a memory module for storing the physical address of the computer, and an I/O module;

a communications controller in communication with the programmable logic device, the communications controller having the communication port; and a user-actuated device;

wherein the communications controller sends the WOL magic packet signal to the computer over the network cable;

wherein the logic circuit generates, and the communications controller transmits, the WOL magic packet signal in response to actuation of the user-actuated device.

13. The workstation of claim 1 further comprising a user accessible input device that controls access to the computer workstation.

14. The workstation of claim 13, wherein the user-actuated device is located in the user accessible input device.

15. The workstation of claim 14, wherein the user-actuated device comprises one of a switch or a button.

16. The workstation of claim 1 further comprising a keyboard tray that is retractable to a stowed position beneath the work surface.

17. The workstation of claim 1, further comprising a control unit that controls access to the workstation or computer, the control unit comprising at least one of a button, a switch, an alpha/numeric keypad, a numeric keypad, an alphabetic keypad, and a biometric access device.

18. The workstation of claim 17, wherein the user-actuated device is located in the control unit.

19. The workstation of claim 18, wherein the user-actuated device comprises one of a switch or a button.

20. A mobile workstation, comprising:
a moveable chassis;
a substantially horizontal tray supported by the chassis that defines a work surface;
a height adjustment mechanism for altering the height of the horizontal tray;
a display screen adjacent to the work surface that is tiltable relative to the work surface;
an input device tray supported adjacent to the work surface;
a power unit supported by the chassis for supplying power to the display screen;
a computer having a network interface with a MAC address and having a single network port available for a wired connection to a computer network; and
a remote activation device located on the computer workstation, the remote activation device operable to up the computer using a WOL magic packet signal while the computer is shut down and not connected to a computer network, the remote activation device storing the physical address of the computer, selectively generating the WOL magic packet signal based on the physical address, and selectively transmitting the WOL magic packet signal to the computer over a network cable, the network cable directly connected at a first end to one of the N ports of the computer and at a second end to a communication port of the remote activation device;

wherein the remote activation device comprises:

a microcontroller comprising a processor module for generating the WOL magic packet signal, a memory module for storing the MAC address of the computer, and an I/O module;

a communications controller in communication with the microcontroller and having the network port; and a user-actuated device wherein the communications controller sends the WOL magic packet signal to the network port of the computer over the network cable;

wherein the microcontroller generates and the communications controller transmits the WOL magic packet signal in response to actuation of the user-actuated device.

21. The mobile workstation of claim 20, wherein the height adjustment mechanism comprises a telescopically extending vertical beam, the vertical beam being extendable to different lengths in a vertical direction.

22. The mobile workstation of claim 20, wherein said power unit is housed within the chassis.

23. The mobile workstation of claim 20, further comprising a tray housing mounted to and beneath said horizontal work surface and slidably receiving said pull-out tray therein.

24. The mobile workstation of claim 20, wherein the moveable chassis comprises a plurality of wheels and a portion of the power unit extends below an upper surface of the wheels.

25. The mobile workstation of claim 20, wherein the computer is integrated within a common housing with the display screen.

26. The mobile workstation of claim 25, wherein the common housing, the computer and the display screen are tiltably mounted relative to the horizontal work surface.

27. The mobile workstation of claim 20, wherein the user-actuated device comprises one of a switch or a button.

28. The mobile workstation of claim 20 wherein the remote activation device further comprises a timer module; and
wherein the microcontroller generates and the communications controller transmits the WOL magic packet at a predetermined time.

29. The mobile workstation of claim 20 wherein the communications controller of the remote activation device further comprises a wireless-network interface module for wireless network connectivity to a WLAN.

30. The mobile workstation of claim 20 wherein the user-actuated device further comprises an antenna for receiving signals at a frequency different than the frequency at which any WLAN is operating.

31. The mobile workstation of claim 30, wherein the microcontroller generates and the communications controller transmits the WOL magic packet signal in response to receipt of a signal by the antenna.

32. The mobile workstation of claim 20, wherein the remote activation device further comprises a power source for powering the device.

33. The mobile workstation of claim 32, wherein the power source of the remote activation device comprises a battery.

34. The mobile workstation of claim 20, wherein the remote activation device is powered by the power unit.

35. The mobile workstation of claim 20, wherein the remote activation device comprises an external data interface.

36. The mobile workstation of claim 35, wherein the external data interface of the remote activation device comprises a universal serial bus port.

37. A method for enabling WOL capability in a target computer when the computer is not connected to a wired computer network, the target computer having N communication ports available for wired connection to a computer network by a network cable, wherein N is an integer greater than zero, the method comprising:
    providing a remote activation device having a network interface with a communication port for direct connection to one of the N communication ports of the target computer via a network cable, wherein none of the other (N−1) ports of the target computer are connected to a computer network by a wired connection, the remote activation device comprising:
    one of a processor module or a logic circuit for generating a WOL magic packet signal, a memory module for storing the MAC address of the computer, and an I/O module;
    a communications controller in communication with the processor module or a logic circuit, the communications controller having a wired-network interface;
    a network cable connected at a first end to the wired network interface of the communications controller and at a second end to the wired network interface of the computer; and
    a user-actuated device;
    synchronizing the remote activation device with the target computer;
    initiating operation of the remote activation device in response to actuation of the user-actuated input device;
    generating a WOL magic packet signal by the one of a processor module or a logic circuit of the remote activation device; and
    sending the WOL magic packet signal from the communication port of the remote activation device to the one of the N communication ports of the target computer over the network cable to wake up the target computer.

38. The method of claim 37, further comprising:
    establishing wireless network connection between the target computer and a WLAN;
    remotely initiating operations on the target computer via a WLAN.

39. The method of claim 38, wherein the step of remotely initiating operations on the target computer via a WLAN comprises initiating at least one of computer system maintenance, computer software upgrades or computer virus scanning.

40. The method of claim 37, wherein the step of synchronizing the remote activation device with the target computer comprises obtaining the physical address for the target computer and programming the physical address into the remote activation device.

41. A computer workstation comprising:
    a chassis;
    a horizontal work surface supported by the chassis;
    a display screen positioned above the work surface;
    an input device tray located near the work surface;
    a computer having a single wired network interface and a MAC address; and
    a remote activation device for enabling WOL capability in the computer when the computer is not connected to a wired computer network, the remote activation device comprising:
    one of a processor module or a logic circuit for generating a WOL magic packet signal, a memory module for storing the MAC address of the computer, and an I/O module;
    a communications controller in communication with the processor module or a logic circuit, the communications controller having a wired-network interface;
    a network cable connected at a first end to the wired network interface of the communications controller and at a second end to the wired network interface of the computer; and
    wherein the communications controller sends the WOL magic packet signal to the computer over the network cable;
    wherein the remote activation device is operable to wake up the computer using a WOL magic packet signal while the computer is shut down and not connected to a computer network, store the physical address of the computer, selectively generate the WOL magic packet signal based on the physical address, and selectively transmit the WOL magic packet signal to the computer over a network cable, the network cable directly connected at a first end to one of the N ports of the computer and at a second end to a communication port of the remote activation device, wherein none of the other (N−1) ports of the computer are connected to a computer network by wired connection;
    wherein the remote activation device further comprises a user-actuated device; and
    wherein the one of a processor module or a logic circuit generates and the communications controller transmits the WOL magic packet signal in response to actuation of the user-actuated device.

42. The computer workstation of claim 12, wherein the communications controller of the remote activation device further comprises a wireless-network interface module for wireless network connectivity to a WLAN.

43. The computer workstation of claim 12, wherein the user actuated device further comprises an antenna for receiving signals at a frequency different than the frequency at which any WLAN is operating.

44. The computer workstation of claim 43, wherein the microcontroller generates and the communications controller transmits the WOL magic packet signal in response to receipt of a signal by the antenna.

45. The computer workstation of claim 12, wherein the remote activation device further comprises a power source for powering the device.

46. The computer workstation of claim 45, wherein the power source of the remote activation device comprises a battery.

47. The computer workstation of claim 12, wherein the remote activation device is powered by the power unit.

48. The computer workstation of claim 12, wherein the remote activation device further comprises an external data interface.

49. The computer workstation of claim 48, wherein the external data interface of the remote activation device comprises a universal serial bus port.

50. The workstation of claim 12 further comprising a user accessible input device that controls access to the computer workstation.

51. The workstation of claim 50, wherein the user-actuated device is located in the user accessible input device.

52. The workstation of claim 51, wherein the user-actuated device comprises one of a switch or a button.

53. The workstation of claim 12 further comprising a keyboard tray that is retractable to a stowed position beneath the work surface.

54. The workstation of claim 12, further comprising a control unit that controls access to the workstation or computer, the control unit comprising at least one of a button, a switch, an alpha/numeric keypad, a numeric keypad, an alphabetic keypad, and a biometric access device.

55. The workstation of claim 17, wherein the user-actuated device is located in the control unit.

* * * * *